(No Model.)
E. FRANKLIN.
COTTON CHOPPER AND CULTIVATOR.
No. 364,811. Patented June 14, 1887.
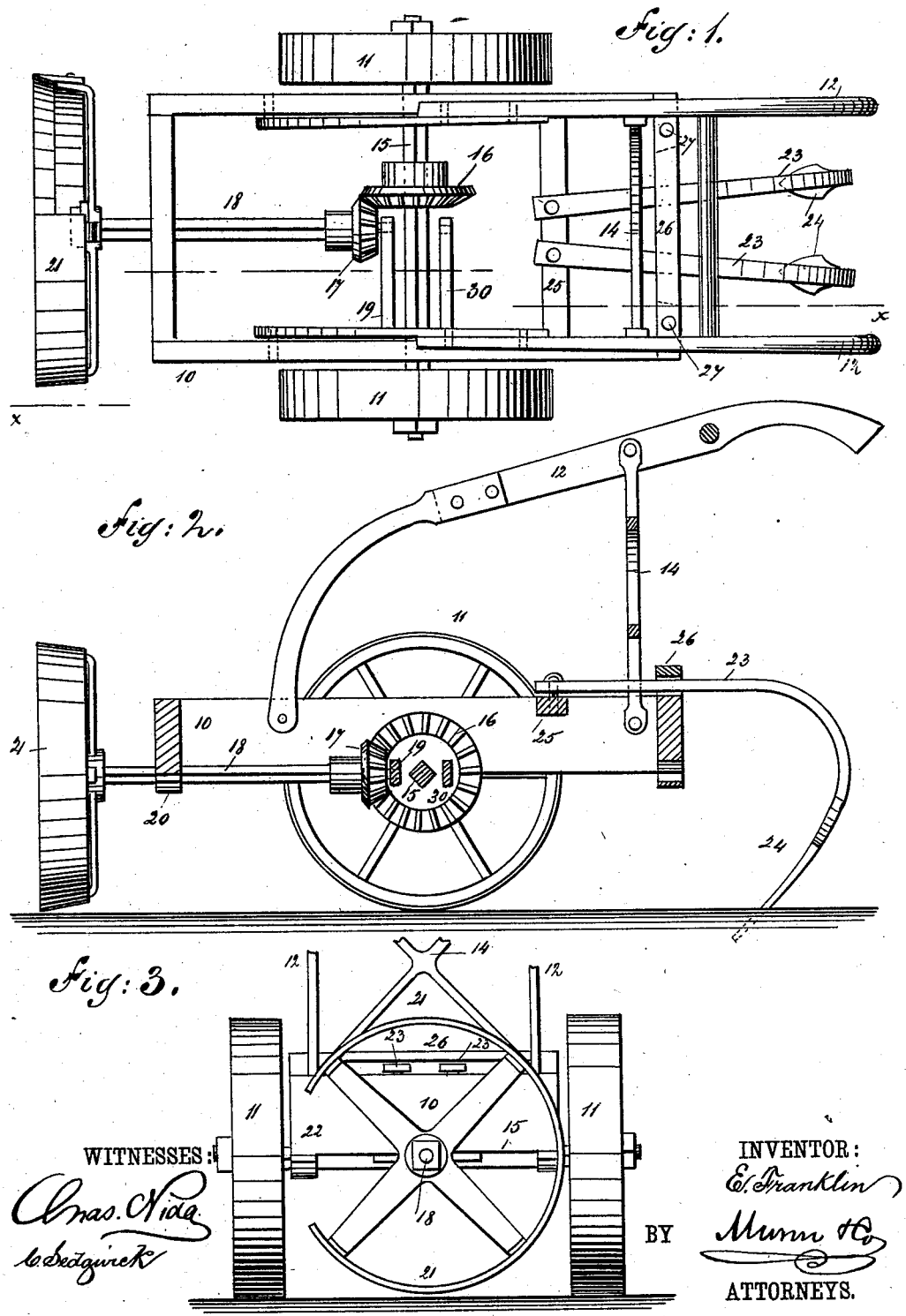

UNITED STATES PATENT OFFICE.

EDWARD FRANKLIN, OF THOMASVILLE, GEORGIA.

COTTON CHOPPER AND CULTIVATOR.

SPECIFICATION forming part of Letters Patent No. 364,811, dated June 14, 1887.

Application filed August 31, 1886. Serial No. 212,309. (No model.)

*To all whom it may concern:*

Be it known that I, EDWARD FRANKLIN, of Thomasville, in the county of Thomas and State of Georgia, have invented a new and Improved Cotton-Chopper and Cotton-Cultivator, of which the following is a full, clear, and exact description.

The object of my invention is to provide an agricultural implement which may be moved by hand, and which may be used either as a cotton chopper or cultivator, or may be used as both a chopper and a cultivator at the same time.

Reference is to be had to the accompanying drawings, forming a part of this specification, in which similar figures of reference indicate corresponding parts in all the views.

Figure 1 is a plan view of my improved machine. Fig. 2 is a longitudinal vertical sectional view of the same, the view being taken on broken line $xx$ of Fig. 1; and Fig. 3 is a view of the forward end of the machine when the parts are adjusted as represented in Fig. 1.

In constructing such a machine as the one illustrated in the drawings above referred to, I provide a frame, 10, which is mounted upon wheels 11 and provided with handles 12, said handles being supported and braced by a proper frame-work, as 14. Upon the axle 15 of the wheels 11 there is rigidly mounted a beveled gear, 16, which serves as the driving-gear for a beveled pinion, 17, carried by a shaft, 18, the inner end of which is supported by bearings formed in a bracket or arm, 19, while the outer end of the shaft is supported by bearings 20, that are secured to the forward timber of the frame 10. Upon the extending end of the shaft 18 there is mounted a circular chopper or knife, 21, but the ends of the blade forming this knife 21 do not meet, there being an opening, 22, between the approaching ends of the blade.

Standards 23, carrying cultivator-shovels 24, are mounted at the rear of the machine, preferably in the manner represented in the drawings—that is, the forward ends of the horizontal portions of the standards are bolted to a cross-beam, 25, the standards being clamped to the rear cross-bar of the frame 10 by a clamping-strip, 26, which is held to the said rear cross-bar of the frame 10 by bolts 27, whereby the said cultivators can be held to work at such distance apart as may be desired.

In operation, the machine is shoved forward by an attendant, who grasps the handles 12, and as the machine moves forward the rotary motion of the axle 15 will be imparted to the knife 21 through the machine of the connections between said knife and the axle 15, and, in revolving, the knife 21 will cut away all young cotton plants and weeds except those that pass through the opening 22 between the projecting ends of the blade of the knife 21, thus leaving a plant or plants at regular stated intervals.

The cultivator-shovels 24 may be used or not, as desired. If deemed advisable, the circular knife or cutter 21 could be secured in an inverse position upon the shaft 18, and the inner end of the shaft 18 could be supported by an arm or bracket, 30, in which case the knife would operate behind instead of in front of the machine.

As this machine will be driven by hand, it will be understood that all trampling of the young plants by teams will be prevented, and it will also be understood that by tilting the machine so as to raise the knife 21 from the ground any particular or special plants might be preserved or saved from the operation of the blade.

Having thus described my invention, what I claim as new, and desire to secure by Letters Patent, is—

In a combined cotton chopper and cultivator, the combination, with the transporting-frame, of the shovel or plow standards pivotally connected to a cross-bar of said frame at their forward ends, and held down upon the rear cross-bar of said frame by a clamp-bar secured to said frame at its ends, and resting upon said standards intermediately of its ends, substantially as shown and described, and for the purpose set forth.

EDWARD FRANKLIN.

Witnesses:
J. E. ROYALL,
W. L. BALL.